United States Patent
Ansell

(10) Patent No.: US 10,514,108 B2
(45) Date of Patent: Dec. 24, 2019

(54) BALL VALVE ASSEMBLY

(71) Applicant: John Guest International Limited, West Drayton, Middlesex (GB)

(72) Inventor: Glen Ansell, Edgware (GB)

(73) Assignee: John Guest International Limited, Middlesex (GB)

( * ) Notice: Subject to any disclaimer, the term of this patent is extended or adjusted under 35 U.S.C. 154(b) by 0 days.

(21) Appl. No.: 15/979,124

(22) Filed: May 14, 2018

(65) Prior Publication Data

US 2018/0335161 A1 Nov. 22, 2018

(30) Foreign Application Priority Data

May 17, 2017 (GB) .................................. 1707934.4

(51) Int. Cl.
*F16K 5/06* (2006.01)
*F16K 27/06* (2006.01)
(Continued)

(52) U.S. Cl.
CPC .......... *F16K 27/067* (2013.01); *F16K 5/0605* (2013.01); *F16K 5/0642* (2013.01);
(Continued)

(58) Field of Classification Search
CPC .... F16K 27/067; F16K 31/602; F16K 5/0642; F16K 5/0657; F16K 5/0605; F16K 5/0647; F16K 5/08
(Continued)

(56) References Cited

U.S. PATENT DOCUMENTS 3,635,439 A * 1/1972 McNally ................. F16K 5/201
251/315.14
3,951,380 A * 4/1976 Oliva-Bonino ....... F16K 5/0642
251/304

(Continued)

FOREIGN PATENT DOCUMENTS

| CH | 588651 A5 * | 6/1977 |
| GB | 2281924 A | 3/1995 |
| WO | 2004/109167 A1 | 12/2004 |

OTHER PUBLICATIONS

United Kingdom Search Report dated Nov. 3, 2017, issued in GB Application No. 1707934.4, filed May 17, 2017.

Primary Examiner — John Bastianelli
(74) Attorney, Agent, or Firm — Workman Nydegger

(57) ABSTRACT

A ball valve assembly includes a duct with a central passage for the flow of fluids. A ball valve is rotatably mounted within the duct. The ball valve has a through bore selectively alignable in an operational position with the central passage to allow flow through the valve assembly. A lateral opening is provided in the duct. A handle attached to the ball valve extends through the lateral opening such that it is accessible from outside the duct to allow rotation of the ball valve. The ball valve, handle and duct are sized so that the ball valve and handle together are insertable into one end of the duct in a first orientation to an intermediate position, from which position and orientation the ball valve and handle together can be manipulated without the ball valve leaving the duct to a final position with a second orientation in which the handle extends out through the lateral opening and the ball valve is in its operational position.

11 Claims, 6 Drawing Sheets

(51) Int. Cl.
 *F16K 31/60* (2006.01)
 *F16K 5/08* (2006.01)
(52) U.S. Cl.
 CPC .............. *F16K 5/0647* (2013.01); *F16K 5/08* (2013.01); *F16K 31/602* (2013.01); *F16K 5/0657* (2013.01)
(58) Field of Classification Search
 USPC ........................................ 251/315.05, 315.14
 See application file for complete search history.

(56) References Cited

U.S. PATENT DOCUMENTS

| | | | | |
|---|---|---|---|---|
| 4,172,583 | A | * | 10/1979 | Wrasman .......... B29C 45/14754 251/172 |
| 4,214,732 | A | * | 7/1980 | Kindersley ........... F16K 5/0642 251/315.14 |
| 5,735,307 | A | | 4/1998 | Charron |
| 2012/0273709 | A1 | | 11/2012 | Zhang |

\* cited by examiner

BALL VALVE ASSEMBLY

CROSS-REFERENCE TO RELATED APPLICATIONS

This application claims priority to United Kingdom Application No. 1707934.4, filed May 17, 2017, the contents of which is incorporated herein by specific reference.

BACKGROUND OF THE INVENTION

1. The Field of the Invention

The present invention relates to a ball valve assembly. In particular, it relates to a ball valve assembly which can be used, for example, in a plastic or copper pipe system in plumbing applications, such as domestic or larger scale water or central heating systems.

2. The Relevant Technology

Such ball valves assemblies generally comprise a duct with a central passage for the flow of fluids; a ball valve rotatably mounted within the duct, the ball valve having a through bore selectively alignable in an operational position with the central passage to allow flow through the valve assembly; a lateral opening in the duct; a handle attached to the ball valve and extending through the lateral opening such that it is accessible from outside the duct to allow rotation of the ball valve. Such a ball valve assembly will subsequently be referred to as "of the kind described".

Ball valves of the kind described, often referred to as service valves, have a long established conventional design. The ducts may be either metal or plastic, but both forms typically incorporate a metal ball. The metal ball is expensive to produce and is difficult to assemble into the body during manufacture. One such ball valve is shown in FIGS. 1-3.

The ball valve comprises a duct 1 which is a hollow general cylindrical body 30 having a first end 32 and an opposing second end 34. First end 32 terminates at a terminal end face 36 while second end 34 terminates at a terminal end face 38. A central passage 2 extends through duct 1 between first end 32 and second end 34. Central passage 2 has a central longitudinal axis 40. Quick fit connectors 3 are provided at each end to allow the assembly to be connected at each end to an external pipe. Other end connectors could also be used. In board of each of the connectors 3 is a respective O-ring seal 4 to seal against a pipe inserted into the assembly. The ball valve 5 is provided to control the flow through the central passage. The ball valve 5 has a through bore 6 and is rotatably mounted in a chamber 7 in a central part of the duct 1. The ball valve 5 is sealed at both ends by a pair of O-ring seals 8, 9 to prevent the through flow in the central passage 2 from bypassing the ball valve 5. The ball valve 6 has a neck 10 which extends into a lateral bore 11 in the wall of the duct 1, the interface being sealed by an O-ring 12.

In order to assemble the ball valve assembly, the O-ring 8 is first put in place against a shoulder 11 projecting inwardly from the wall of the central passage 2. The ball valve 5 is then placed into the central passageway 2 from the right hand end as shown in FIG. 1. Initially the ball valve 5 is in an orientation in which the neck 10 leads the way along the central passage 2 until the ball valve 6 reaches the chamber 7 whereupon it is rotated into the position shown in FIG. 1 in which the O-ring seal 12 seals with the lateral port 11. The second seal 9 is then put in place and a retaining sleeve 13 is inserted from the first end 32 of the duct 1 in order to hold the ball valve 6 in place, as shown in FIG. 1. The final O-ring 4 and quick fit connector 3 on the right hand end of FIG. 1 are then put in place.

In order to attach a handle 15 to the ball valve, a screw 16 with a washer 17 is inserted through an opening 18 in the handle 15 and an opening 19 in the top of the ball valve 6. Opening 19 is provided with a female screw thread to attach the handle 15 in place.

The ball valve 5 is expensive to manufacture and is not easy to assemble into the body as it is awkward to hold the neck 10 of the ball valve 5 through the lateral opening 11 and to rotate the ball valve 5 into the position shown in FIG. 1.

SUMMARY OF THE INVENTION

We have investigated producing a ball valve 5 as a plastic component but have been unsuccessful in developing a sufficiently robust joint between the handle 15 and ball valve 5.

According to the present invention a ball valve assembly of the kind described is characterised in that the ball valve, handle and duct are sized so that the ball valve and handle together are insertable into one end of the duct in a first orientation to an intermediate position, from which position and orientation the ball valve and handle together can be manipulated without the ball valve leaving the duct to a final position with a second orientation in which the handle extends out through the lateral opening and the ball valve is in its operational position.

With the present invention, the ball valve and handle together are inserted into the duct. This component is significantly longer than the ball valve alone such that the component is more easy to manipulate once it is in the duct. Because of this, it is easier to cause the end of the handle to be manipulated into the lateral bore than it is to align the neck of the ball valve as in the prior art.

The ball valve and handle may be separate components which are attached to one another. However, preferably, the ball valve and handle are integrally formed as a single component. This means that the two components are formed together as part of the same step in which the material forming the two components is first formed into the shape of the handle and ball valve. This process is preferably a moulding step but may, for example, be forging, die-casting or 3D printing. In any event, there is no separate joining step between the ball valve and the handle as the components are formed together.

The integrally formed ball valve and handle component may be formed of metal. However, it is preferably formed of plastic as this eliminates the costly metal ball valve and also solves the above mentioned problem of connecting the handle and ball valve when the ball valve is plastic.

The duct and ball valve are preferably configured such that in the first orientation towards the intermediate position, there is contact between the ball valve and the duct in a manner tending to cause rotation of the ball valve and handle such that the end of the handle is moved towards the lateral opening. This facilitates the insertion process as this contact will naturally tend to cause the end of the handle to move towards and through the lateral bore thereby considerably facilitating the handling process.

The invention also extends to a method of making a ball valve assembly.

BRIEF DESCRIPTION OF THE DRAWINGS

An example of a valve assembly in accordance with the present invention will now be described with reference to the accompanying drawings, in which.

DETAILED DESCRIPTION OF THE PREFERRED EMBODIMENTS

Figure 1:
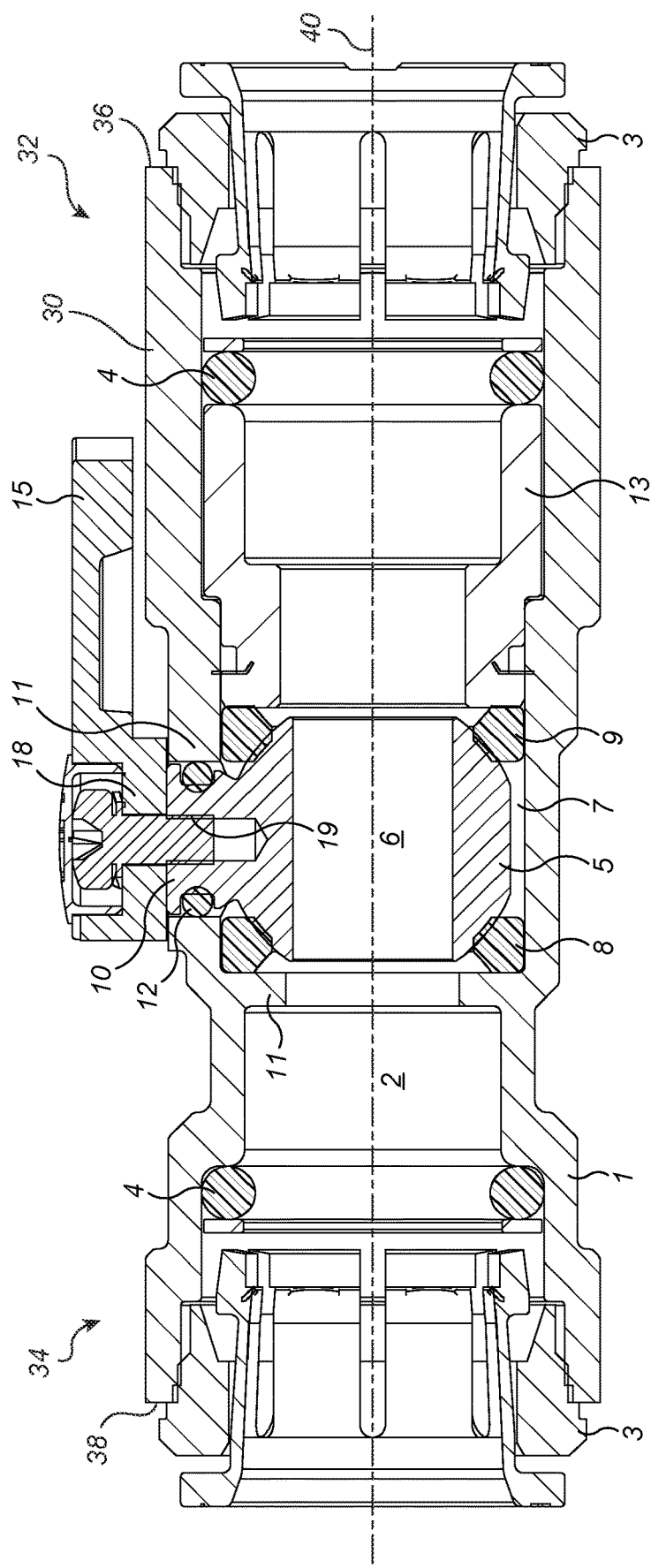
FIG. 1 is a cross sectional view through a conventional ball valve assembly.
Figure 2:
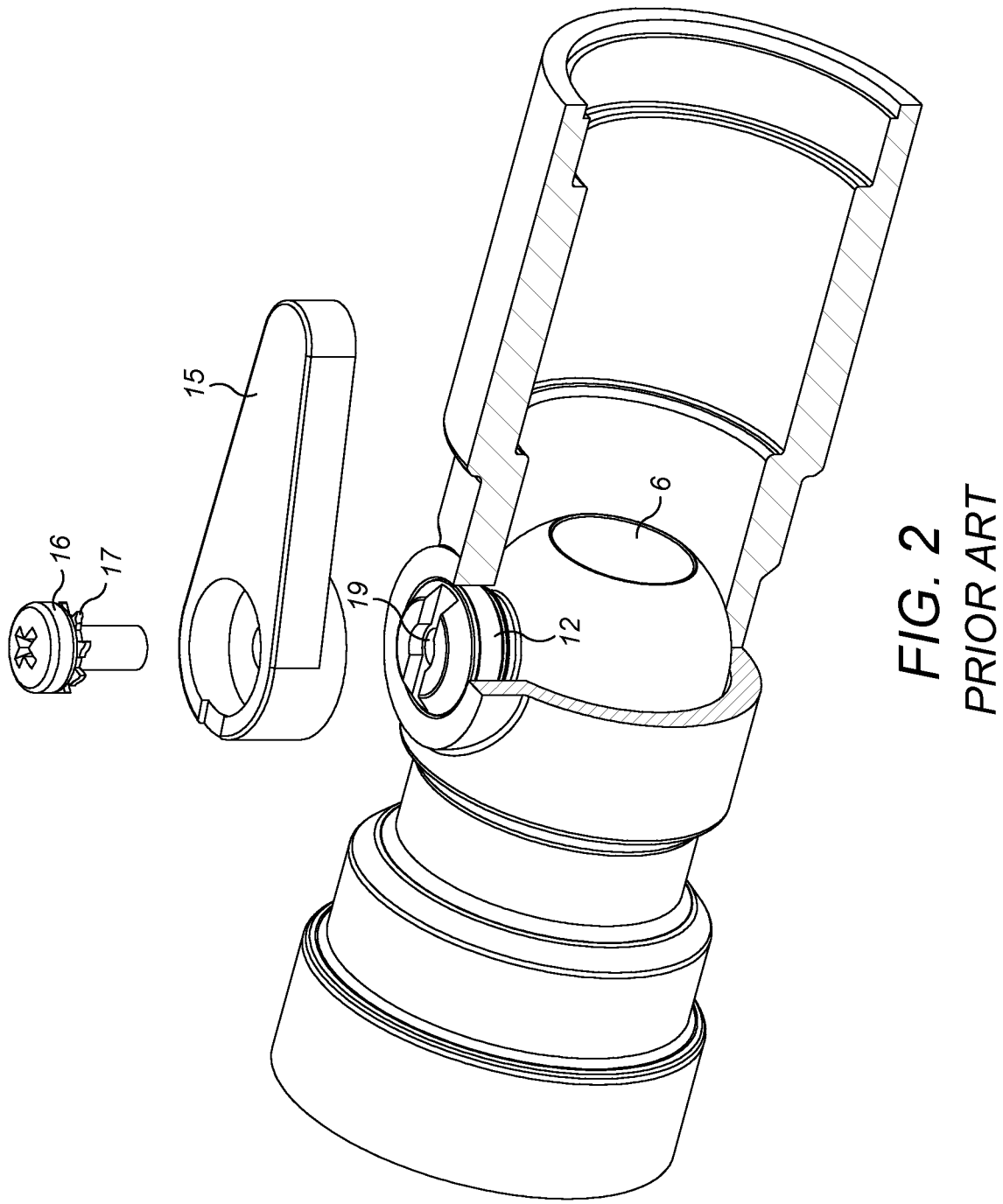
FIG. 2 is a partially cut away and partially exploded perspective view of the ball valve assembly of FIG. 1.
Figure 3:
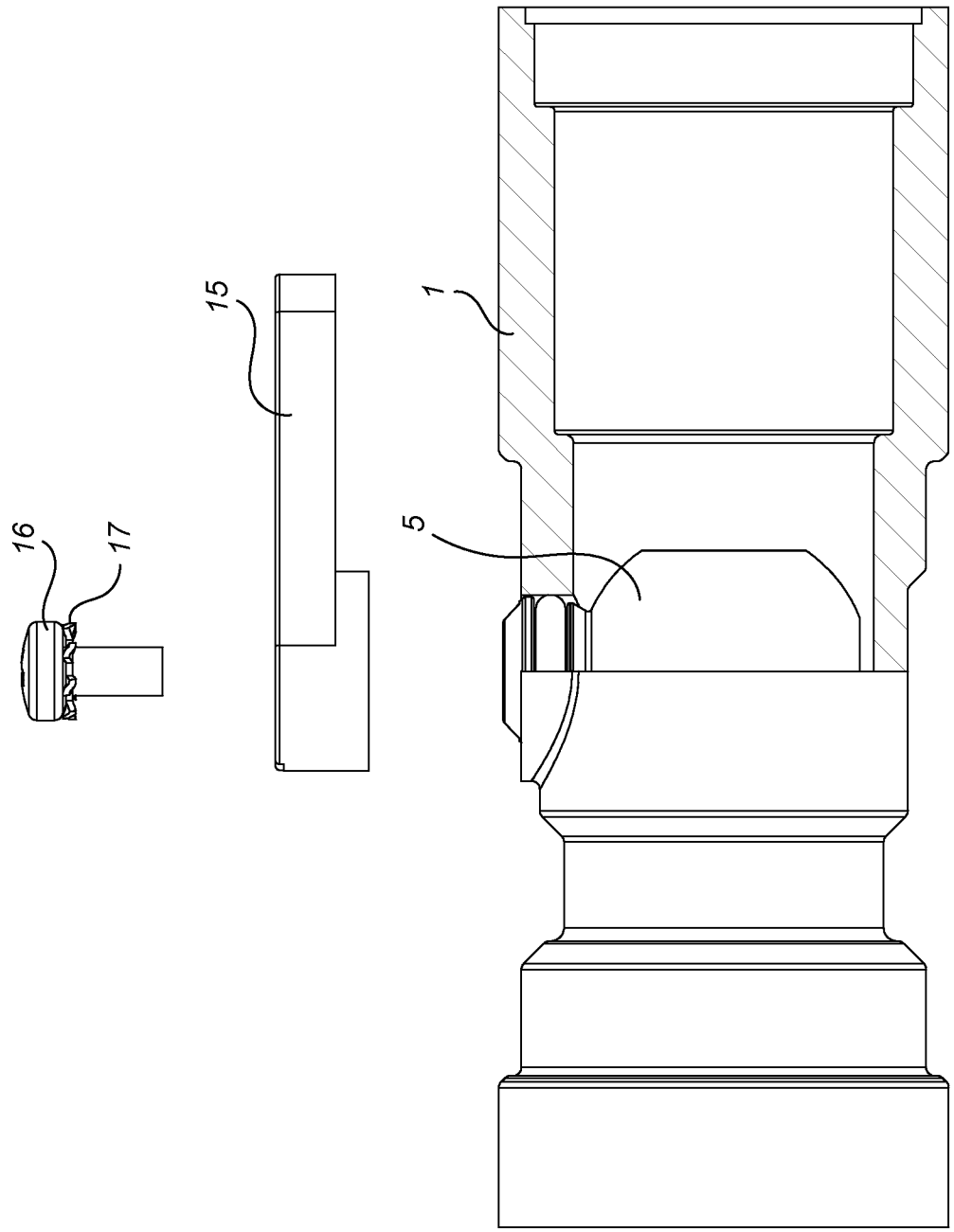
FIG. 3 is a side view showing the same cut away and partially exploded view as shown in FIG. 2.
Figure 4:
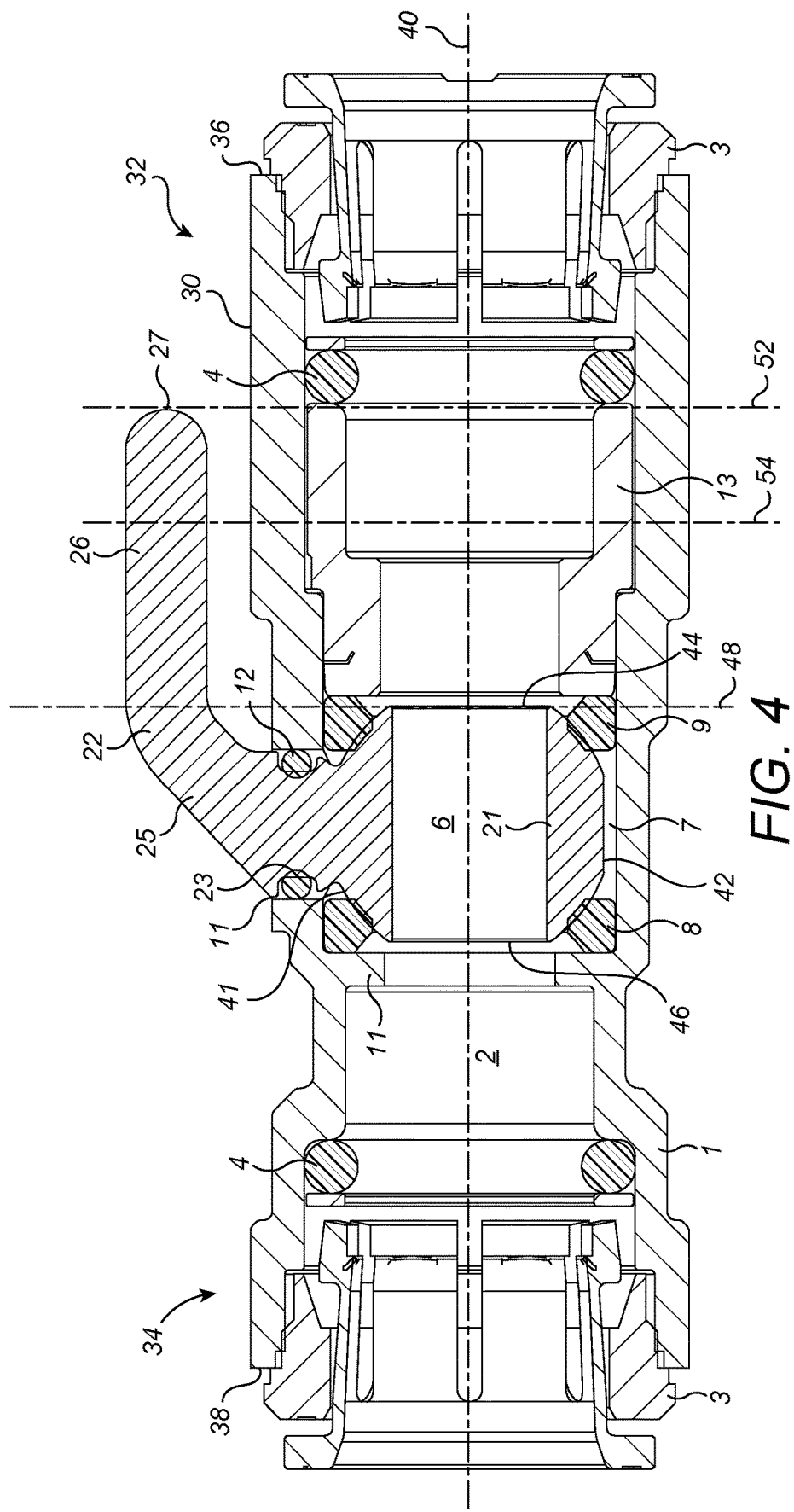
FIG. 4 is a cross sectional view similar to FIG. 1 showing the example of the present invention.

All of the parts of the ball valve assembly shown in FIG. 4, other than the ball valve and handle, are the same as those shown in FIG. 1 and the same reference numerals have been used to designate these same components. Only the improvement provided by the present invention will be described here.

Figure 6:
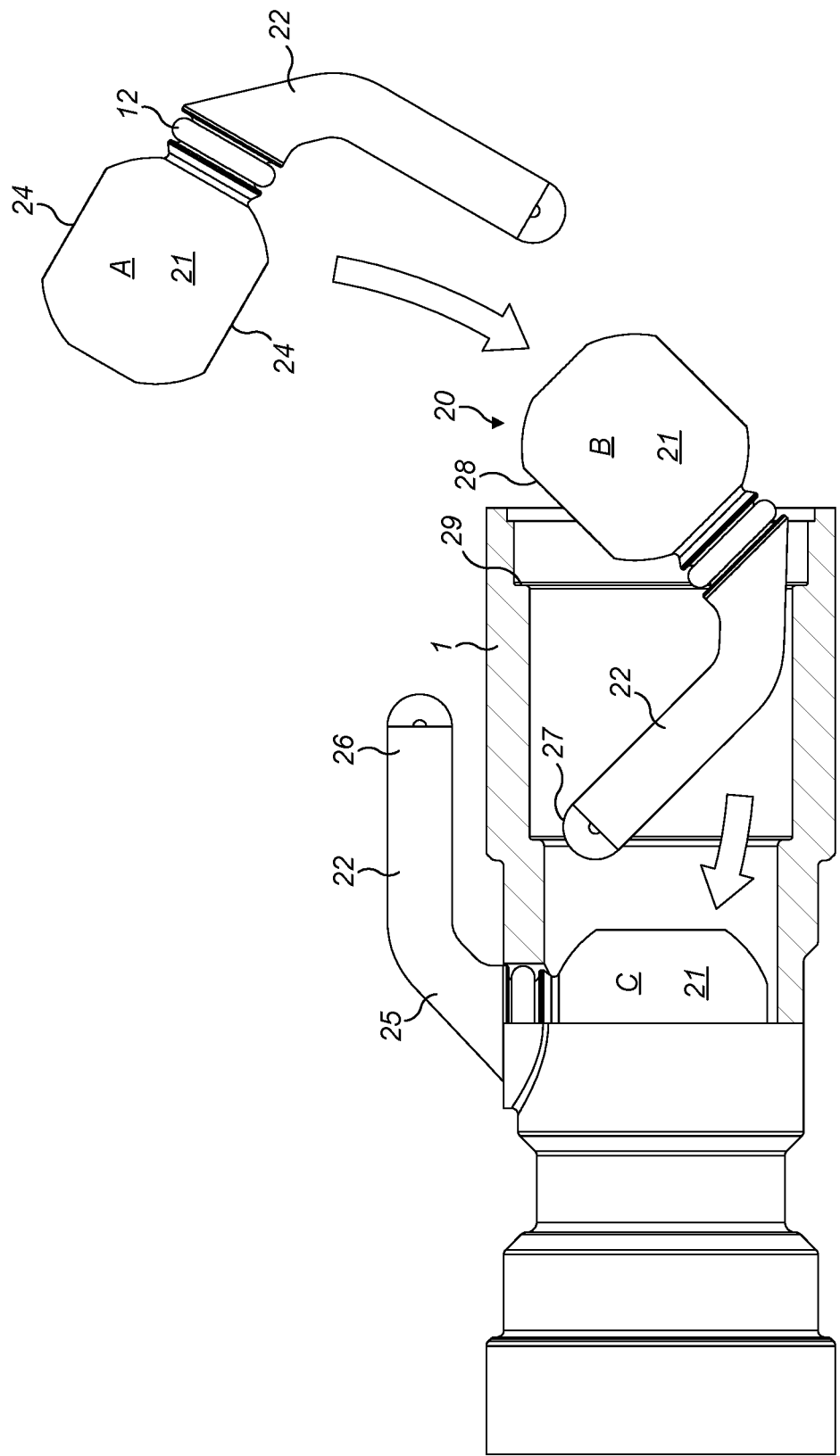
FIG. 6 is a cross sectional view, corresponding to the perspective view of FIG. 5.

The improvement comprises the integration of the ball valve and handle into a single sub assembly 20 which has a ball valve portion 21 and a handle portion 22. As shown in FIG. 4, the ball valve portion 21 and handle portion 22 are formed as a one-piece component, for example, by being moulded as a single, continuous component. The only additional component is the O-ring 12 which is fitted over the handle portion 22 into a groove 23. The geometry of the ball valve portion 21 is similar to that of the previously described ball valve 5 in that it fits within the chamber 7 between seals 8, 9 and has a through bore 6. It will be understood that while this component is referred to as ball valve portion 21 and has a generally spherical shape, there is significant scope for departing from a truly spherical shape, not least because the two ends adjacent to the through bore 6 are generally flat portions 24, as best shown in FIG. 6. With reference to FIG. 4, ball valve portion 21 can be further defined as having a top surface 41 and an opposing bottom surface 42 that extend between a first end face 44 and an opposing second end face 46. Through bore 6 passes through ball valve portion 21 between first end face 44 and second end face 46. At least a portion of first end face 44 is disposed within a first plane 48 that orthogonally intersects with central longitudinal axis 40 of central passage 2 of duct 1 when ball valve portion 21 is selectively aligned in an operational position so that through bore 6 is aligned with central passage 2 to allow the flow of fluids through central passage 2 of the duct 1. First end face 44 of ball valve portion 21 is disposed closer to first end 32 of duct 1 than second end face 46 of ball valve portion 21 when ball valve portion 21 is in the operational position.

By comparison with FIG. 1, the handle portion 22 has a significantly different shape from the handle 15. In particular, while the handle 15 is directly perpendicular to the ball valve 5, the handle portion 22 has a smoother transition in that it has an angled portion 25 which is at approximately 45 degrees to the axis of rotation of the ball valve portion 21.

The angled portion 25 leads into a main portion 26 which is spaced further from the duct 1 than the handle 15 in FIG. 1. Main portion 26 of handle portion 22 terminates at a terminal end 27. At least a portion of terminal end 27 of handle portion 22 is disposed within a second plane 52 that orthogonally intersects with central longitudinal axis 40 of duct 1 when ball valve portion 21 is in the operational position. In this configuration, second plane 52 is disposed closer to first end 32 of duct 1 than first plane 48. As discussed above, retaining sleeve 13 is disposed within first end 32 of duct 1. Handle portion 22 is shown having a sufficient length so that a third plane 54 disposed orthogonal to central longitudinal axis 40 of central passage 2 of duct 1 intersects with handle portion 22 and retaining sleeve 13.

Figure 5:
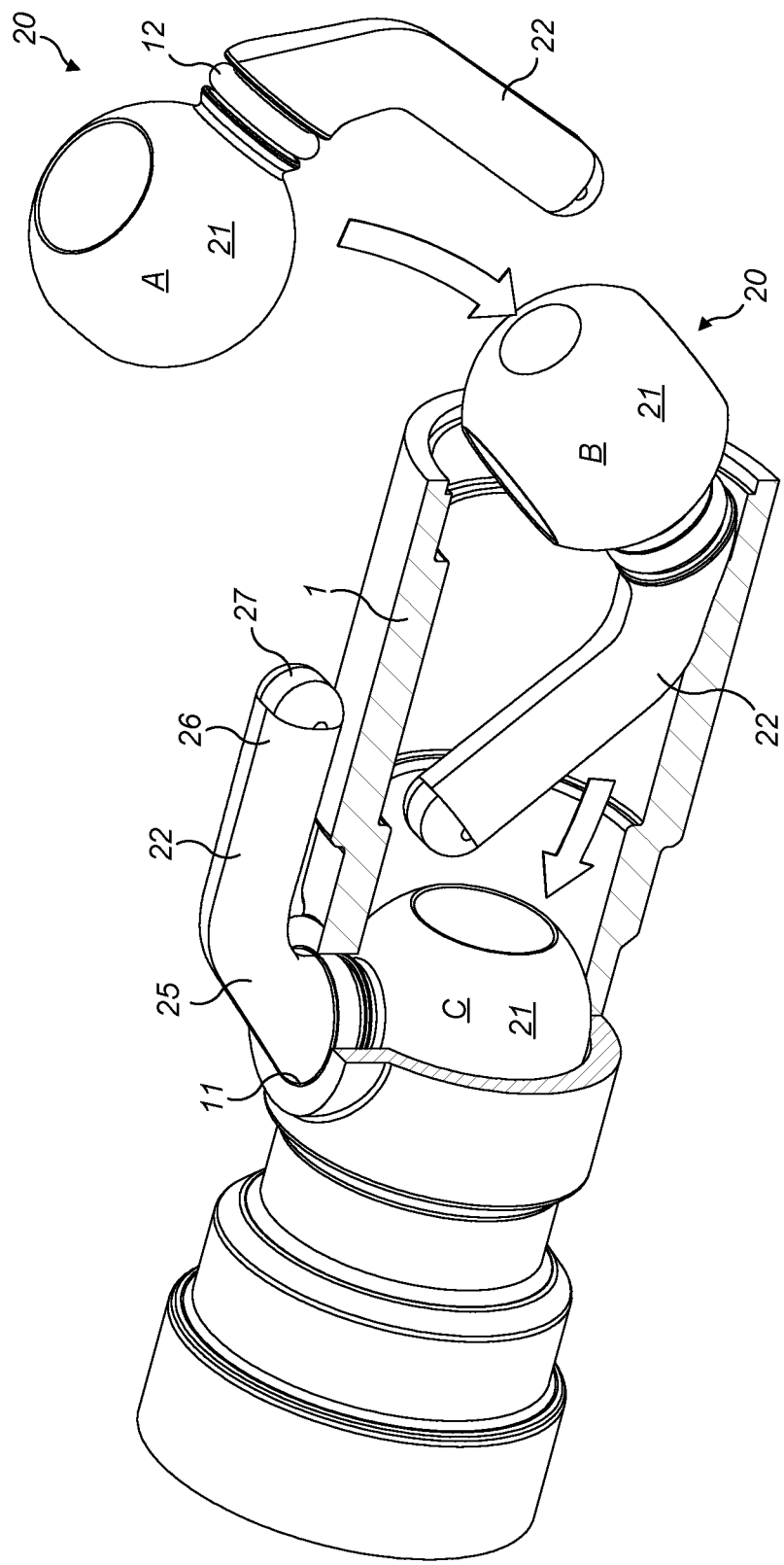
FIG. 5 is an exploded perspective view similar to FIG. 2 showing an example of the present invention with the ball valve and handle subassembly show in the three different positions illustrating different position within the assembly process.

The reason for the above geometry of ball valve portion 21 and handle portion 22 is apparent from the manner in which the ball valve assembly is assembled, as will now be described. FIGS. 5 and 6 both show the sub assembly 20 initially outside of the duct 1 in the first position A. It is then shown in an intermediate position B and a final position C which corresponds to the position shown in FIG. 4. As is apparent from the intermediate position B shown in FIGS. 5 and 6, the above described geometry enables the sub assembly 20 to be inserted into the duct 1. As the sub assembly 20 moves further into the duct 1 from the intermediate position, the terminal end 27 of the handle approaches the lateral opening 11. During the assembly process, the assembler is able to hold the duct 1 with the lateral opening 11 uppermost and also to grip the ball valve portion 21 of the sub assembly 20 and hold this in an orientation such that the terminal end 27 of the handle portion 22 is uppermost.

With the terminal end 27 of the handle portion 22 beneath the lateral opening 11, a top front portion 28 of the ball valve portion 21 bears against shoulder 29 in the duct 1 thereby tipping the sub assembly 20 in a clockwise orientation, with reference to FIGS. 5 and 6, causing the terminal end 27 of the handle portion 22 to begin to move up towards and through the lateral opening 21. Further manipulation of the sub assembly 20 into the duct 1 continues this rotation of the sub assembly 20 towards the final position. The assembler can encourage this rotation by exerting downward pressure on the ball valve portion 21 and/or by gripping the terminal end 27 of the handle portion 22 as it emerges through the lateral opening 11, thereby twisting the sub assembly 20 into the final position, as shown in FIG. 4. Once this is in place, the seal 9, retaining sleeve 13, second O-ring seal 4 and quick fit connector 3 are put in place as described in relation to the prior art example.

It will be appreciated that there are numerous variations of the geometry of the duct 1, ball valve portion 21 and handle portion 22 which allow the sub assembly 20 to be inserted. For example, there may be a bulge in the lower portion of the duct 1 on the opposite side of the duct 1 from the lateral opening 11 to allow sufficient clearance for the ball valve portion 21 to be rotated into place. However, the illustrated arrangement with the handle portion 22 having the non-abrupt transition towards the main handle portion 26 provides an arrangement which can be fitted into an unmodified duct 1 but still have sufficient clearance to allow the rotation of the sub assembly into the final position as described.

The invention claimed is:

1. A method of forming a ball valve assembly comprising:
a duct having a first end and an opposing second end with
a central passage extending therebetween for the flow of fluids, the central passage having a central longitudinal axis;

a ball valve rotatably mounted within the duct, the ball valve having a top surface and an opposing bottom surface that extend between a first end face and an opposing second end face, a through bore passing through the ball valve between first end face and the second end face, at least a portion of the first end face being disposed within a first plane that orthogonally intersects with the central longitudinal axis of the duct when the ball valve is selectively aligned in an operational position so that the through bore is aligned with the central passage to allow the flow of fluids through the central passage of the duct, the first end face of the ball valve being disposed closer to the first end of the duct than the second end face of the ball valve when the ball valve is in the operational position;

a lateral opening extending through the duct so as to communicate with the central passage;

a handle projecting from the ball valve and extending through the lateral opening such that the handle is accessible from outside the duct to allow rotation of the ball valve, the handle terminating at a terminal end, at least a portion of the terminal end of the handle being disposed within a second plane that orthogonally intersects with the central longitudinal axis of the duct when the ball valve is in the operational position, the second plane being disposed closer to the first end of the duct than the second plane;

the method comprising:
  inserting the ball valve and handle with terminal end together into the first end of the duct to a first position; and
  rotating the ball valve and handle with terminal end together without the ball valve leaving the duct to a final position so that the handle extends out through the lateral opening and the ball valve is in the operational position.

2. The method according to claim 1, further comprising the step of integrally forming the ball valve and handle as a single, continuous component.

3. The method according to claim 1, wherein the ball valve and handle are moulded.

4. The method according to claim 1, wherein the ball valve and handle are plastic.

5. The method according to claim 1, wherein the step of rotating the ball valve and handle comprises advancing the ball valve and handle further into the central passage of the duct so that the ball valve contacts the duct to cause rotation of the ball valve and handle such that the terminal end of the handle is moved towards the lateral opening.

6. A ball valve assembly comprising:
  a duct having a first end and an opposing second end with a central passage extending therebetween for the flow of fluids, the central passage having a central longitudinal axis;
  a ball valve rotatably mounted within the duct, the ball valve having a top surface and an opposing bottom surface that extend between a first end face and an opposing second end face, a through bore passing through the ball valve between first end face and the second end face, at least a portion of the first end face being disposed within a first plane that orthogonally intersects with the central longitudinal axis of the duct when the ball valve is selectively aligned in an operational position so that the through bore is aligned with the valve central passage of the duct, the first end face of the ball valve being disposed closer to the first end of the duct than the second end face of the ball valve when the ball valve is in the operational position;
  a lateral opening extending through the duct so as to communicate with the central passage;
  a handle projecting from the ball valve and extending through the lateral opening such that the handle is accessible from outside the duct to allow rotation of the ball valve, the handle terminating at a terminal end, at least a portion of the terminal end of the handle being disposed within a second plane that orthogonally intersects with the central longitudinal axis of the duct when the ball valve is in the operational position, the second plane being disposed closer to the first end of the duct than the first plane;
  wherein the ball valve, handle with terminal end and duct are sized so that the ball valve and handle with terminal end together can be inserted into the first end of the duct to a first position and then rotated without the ball valve leaving the duct to a final position so that the handle extends out through the lateral opening and the ball valve is in the operational position.

7. The ball valve assembly according to claim 6, wherein the ball valve and handle are integrally formed as a single, continuous component.

8. The ball valve assembly according to claim 7, wherein the ball valve and handle are moulded.

9. The ball valve assembly according to claim 6, wherein the ball valve and handle are plastic.

10. The ball valve assembly according to claim 6, wherein the duct, ball valve and handle are configured such that when the ball valve and handle are in the first position, there is contact between the ball valve and the duct tending to cause rotation of the ball valve and handle such that the terminal end of the handle is moved towards the lateral opening.

11. The ball valve assembly according to claim 6, further comprising a retaining sleeve disposed within the first end of the duct, the handle having a sufficient length so that a third plane disposed orthogonal to the central longitudinal axis of the duct intersects with the handle and the retaining sleeve.

* * * * *